United States Patent [19]

Stacey

[11] Patent Number: 4,870,557
[45] Date of Patent: Sep. 26, 1989

[54] SIMPLIFIED QUASI-HARMONIC NEUTRALIZED HIGH POWER INVERTERS

[75] Inventor: Eric J. Stacey, Penn Hills, Pa.

[73] Assignee: Westinghouse Electric Corp., Pittsburgh, Pa.

[21] Appl. No.: 249,483

[22] Filed: Sep. 23, 1988

[51] Int. Cl.[4] .............................................. H02M 7/44
[52] U.S. Cl. ........................................ 363/43; 363/72
[58] Field of Search .............................. 363/40, 43, 72

[56] References Cited

U.S. PATENT DOCUMENTS

| | | | |
|---|---|---|---|
| 3,671,846 | 6/1972 | Corey | 363/72 |
| 3,876,923 | 4/1975 | Humphrey et al. | 363/40 |
| 3,903,469 | 9/1975 | Ravas | 363/40 |

OTHER PUBLICATIONS

B. D. Bedford et al., *Principles of Inverter Circuits*, copyright 1964, by John Wiley & Sons, Inc., pp. 252, 267, 269, 308, 309.

Gordon S. Stobbelaar et al., "10MVA Powering Conditioning System for Lean Acid Battery Energy Storage System,"]copyright 1987, by General Electrical Company, USA, pp. 1222-1234.

Bendix VSCF Technology, Allied Signal Technologies, pp. 1-12.

*Primary Examiner*—William H. Beha, Jr.
*Attorney, Agent, or Firm*—B. R. Studebaker

[57] ABSTRACT

A quasi-harmonic neutralized static power converter comprises one or more threephase phase shifting transformers having open primary windings fed at opposite ends by poles in separate ones of an associated pair of six-pulse bridge inverter circuits. The secondary winding of at least one of the phase shifting transformers is a delta winding or a wye winding connected to a neutral line. In order to block zero sequence currents which would be induced in such secondaries, a zero sequence blocking transformer is inserted in either the primary or secondary of any one of the phase shifting transformers. Preferably, the zero sequence blocking transformer has three identical zero sequence blocking windings wound on a common core. Each of the zero sequence windings is connected in series with a separate one of the windings in the selected transformer primary or secondary. In the case of a wye secondary connected to a neutral line, a single zero sequence winding in the neutral line can block the zero sequence current in all three phases.

11 Claims, 8 Drawing Sheets

SIMPLIFIED QUASI-HARMONIC NEUTRALIZED HIGH POWER INVERTERS

BACKGROUND OF THE INVENTION

1. Field of the Invention

This invention relates to static high power inverters in which waveforms generated in a plurality of phase displaced bridge inverter circuits are phase shifted by transformers to produce a composite waveform having a pulse count equal to the sum of the pulses generated by the separate bridge circuits and with reduced harmonics. More particularly, the invention is directed to such static high power inverters in which the transformer requirements are reduced, both in the number and complexity, while maintaining the quality of the quasi-harmonic neutralized composite waveform.

2. Background Information

Static inverters employing semiconductor switching devices are now commonly used for many applications including industrial drive, power conditioning, dc-link frequency conversion and the generation of controllable leading or lagging reactive current.

For low power applications, fast switching transistors can be used with high frequency switching or pulse width modulation techniques to realize high quality sinusoidal output waveforms. For larger power ratings where high frequency switching becomes less efficient, programmed waveform techniques are employed to produce a good quality waveform with a reduced number of switchings in each fundamental period.

For very high power applications where many large semiconductor switches are required and where efficiency is important, the switches are operated at fundamental frequency and harmonic neutralizing techniques using special transformer configurations are used. A high quality multi-step output waveform is derived by combining outputs from a number of inverter stages each operating at fundamental frequency. Each step of the output waveform is evenly spaced and has an amplitude proportional to the sine of its angular position. The number of steps is referred to as the pulse number.

In this type of multi-step or multi-pulse inverter, each switching device operates with identical voltage and current waveforms and contributes equally to the output. Because all switches turn on and off at the same levels of current, all devices operate with similar delays and the effects of differences in current dependent switching delays upon the output waveform are minimized.

The harmonic spectrum of the synthesized output contains terms having harmonic orders:

$$H = np \pm 1$$

and amplitude:

$$A_h = 1/(np \times 1)$$

where
p is the pulse number and n is any integer.

If a high quality waveform is desired, a high pulse number is clearly an advantage.

The simplest threephase harmonic neutralized inverter is the six-pulse bridge inverter circuit. This consists of three inverter poles connected across a dc voltage source. Each pole has two switching devices connected in series, the junction of the switches being the ac output terminal.

The three inverter poles each operate at fundamental frequency and produce three square wave outputs with respect to the midpoint of the dc voltage. The three outputs are symmetrically displaced by 120 degrees so that a pole transition occurs every 60 degrees, or in other words, there are six state changes in a cycle of fundamental frequency. The outputs voltages produced between the three ac terminals are true six-pulse waveforms. Requiring no transformer, the six-pulse bridge inverter forms the basic building block generally used to make up higher pulse number inverters.

To produce true harmonic neutralized outputs having pulse number of N×6, the outputs of N six-pulse bridges are combined as follows:

1. The bridges are operated from a common dc source with their outputs incrementally phase displaced by an angle which corresponds to one segment of the desired multi-segment or multi-pulse output. That is a displacement angle of 360/6N degrees.

2. The phase displaced fundamental outputs of individual six-pulse bridges are shifted into phase with each other by individual transformers having appropriate winding configurations and the same voltage ratios.

3. The transformed outputs of each bridge which now have the same fundamental amplitude and phase are combined, either by series connection of the secondaries, by parallel connection through appropriate interphase transformers, or by some combination of series and parallel connection.

To derive the necessary phase shifts, transformers having differently configured windings are required to interconnect the six-pulse building blocks. For a given pulse number, many different transformer configurations could be derived which meet the requirements for true harmonic neutralization. Some of these transformer configurations are non-standard requiring specially fabricated transformers which add significantly to the cost of the inverter. While the improvement in waveform quality obtainable with higher pulse numbers is significant, the increased complexity and cost of the special transformers cannot be justified for most applications.

In practice, the simple winding configurations are preferred and 12-pulse configurations employing wye/wye and delta/wye windings are most common.

Several techniques have been used to combine the outputs of six-pulse bridge inverters to produce a greatly improved "quasi-harmonic neutralized" output with less complicated transformer configurations.

Two basic approaches are:

(a) Employ two or more pairs of wye/wye and wye/delta transformers each fed by a pair of six-pulse bridges to form 12-pulse outputs, each 12-pulse output being generated with an appropriate displacement and the outputs being combined by series connection of the transformer secondaries. The resultant 12-pulse outputs having a small difference in phase combine to produce an output having evenly spaced steps with slight amplitude differences from a true harmonic neutralized waveform. This technique allows readily available standard transformer configurations to be employed for systems having pulse numbers of 24, 36, 48 and so on.

(b) Employ half the number of transformers required for a true harmonic neutralized system, having phase shifts corresponding to a system having half the desired pulse number, and having open wye or zig-zag primaries. Feed the opposite ends of each set of primary windings from two nearly oppositely phased six pulse bridges so that the wave form applied to each transformer primary windings is a quasi-square wave whose amplitude remains at zero for an interval corresponding to one step of the final multi-pulse output. The fundamental phase of the output of each pair of six-pulse bridges is selected to match the fundamental phase of the transformer primary windings when the secondaries are directly in-phase.

An example of an inverter employing method (a) comprises four six-pulse bridge inverters divided into pairs which are connected respectively to wye/wye and delta/wye transformers to produce 12-pulse outputs. The two 12-pulse outputs are displaced so that the first leads and the second lags the final output by 7.5 degrees. The outputs are summed in series to produce a 24-pulse output.

An example of method (b) comprises two identical transformers having wye primaries and 15 degree shift zig-zag secondaries fed by two pairs of six-pulse inverters. The first pair of inverters are operated at angles of 22.5 and (7.5 +180) degrees and feed the opposite ends of the open wye primaries of the first transformer. The second pair of inverters operated at angles of −7.5 and (−22.5 +180) degrees feed the opposite ends of the open wye primaries of the second transformer. The fundamental voltages produced at the secondaries are both at zero degrees and sum directly to form a 24-pulse output.

The first technique (a) does not reduce the total number of transformers required.

The second technique (b) is restricted to phase-shifting transformers which do not have delta windings or other connections which form a short circuit to zero sequence voltages which are generated with this technique.

Resolution of the voltages in a threephase electrical system into positive, negative and zero sequence voltages is a known technique of analyzing such systems. The zero sequence voltages are components of each of the threephase voltages which are in phase and equal magnitude. In a true harmonic neutralized inverter, there are no zero sequence voltages. However, in the quasi-harmonic neutralized inverters with open wye primary windings fed at opposite ends by poles of two different six-pulse bridge inverters, zero sequence voltages are present. If the secondary windings of the phase shifting transformers were connected so as to provide a low impedance path for the zero sequence voltages, large zero sequence currents would flow. Unfortunately, while a wye secondary winding in one phase shifting transformer and a delta secondary winding in a second, provide a simple means of achieving the required 30 degree phase shift for a 24-pulse quasi-harmonic neutralized inverter using standard transformers, such an arrangement would provide a short circuit for zero sequence currents generated in an inverter with open wye primaries fed at opposite ends by separate six-pulse bridge inverters circuits. In addition, wye connected secondaries with a neutral line would provide a short circuit for zero sequence currents in this type of quasi-harmonic neutralized inverter.

There is a need therefore for an improved quasi harmonic neutralized static power inverter which requires a reduced number of preferably standard types of phase shifting transformers to generate quality output waveforms.

There is a further need for such an quasi-harmonic neutralized inverter which can be used with a threephase, four line system.

There is an additional need for such a quasi-harmonic neutralized inverter which can be implemented with minimum number of standard single phase transformers.

SUMMARY OF THE INVENTION

These and other needs are satisfied by the invention which is directed to a quasi-harmonic neutralized static power converter requiring only half the number of phase shifting transformers needed for a true harmonic neutralized inverter and wherein such phase shifting transformers may be, for many applications, simple readily available types, such as those having delta windings and those having wye windings with a neutral connection or even simple combinations of single phase transformers. The novel inverter comprises a plurality of threephase phase shifting transformers having open primary windings each of which is fed at opposite ends by a pole in a separate one of an associated pair of six-pulse bridge inverter circuits. Thus, for a 24-pulse quasi-harmonic neutralized inverter, there are two phase shifting transformers fed by a total of four six-pulse bridge inverter circuits. Similarly, only three phase shifting transformers and six six-pulse bridge inverter circuits are required for a 36-pulse quasi-harmonic neutralized inverter in accordance with the invention.

The secondary windings of the threephase phase shifting transformers may be of various configurations which result in a low impedance path for zero sequence currents. For instance, the secondary windings of one of these phase shifting transformers can be connected in a delta configuration or a closed wye with a midpoint to which a neutral line is connected.

A zero sequence blocking transformer is connected either to the primary windings, the secondary windings or both, of one or more of the phase shifting transformers to block zero sequence current. It is preferable, however, in the interest of economy and reduced complexity, to have one zero sequence transformer which can be connected to either the primary or secondary windings of just one of the phase shifting transformers. In the case of an inverter in accordance with the invention having wye secondary windings connected to a neutral line, the zero sequence blocking transformers can be connected in series with the primary or secondary windings of any of the phase shifting transformers. In a preferred form, the zero sequence blocking transformer comprises three identical zero sequence blocking windings, preferably wound on a common core. Each of the zero sequence windings is connected in series with a separate one of the windings, in either the primary or secondary, of the selected phase shifting transformer. In an alternate form, when connected in series with delta connected secondary windings, the zero sequence windings can be connected between the delta secondary windings and have center taps to which the secondary windings of the other phase shifting transformers are connected in series.

In the case of a phase shifting transformer with closed wye secondary windings and a neutral line connected to the midpoint, each of the three zero sequence windings of the zero sequence transformer can be connected in series with one of the secondary windings, or alternatively, a single zero sequence winding of a modified zero sequence transformer can be connected in the neutral line.

The zero sequence transformer connected as indicated supports zero sequence voltage to thereby block or limit zero sequence current. It does not however, block the threephase fundamental currents generated in the threephase system.

The invention permits the construction of quasi-harmonic neutralized static power inverters requiring only one phase shifting transformer for each pair of six-pulse bridge inverter circuits while utilizing in most configurations standard, readily available threephase transformers, such as transformers with delta connected secondaries and even simple single phase transformers. The invention also permits the use of double fed phase shifting transformers in inverters feeding four wire systems.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
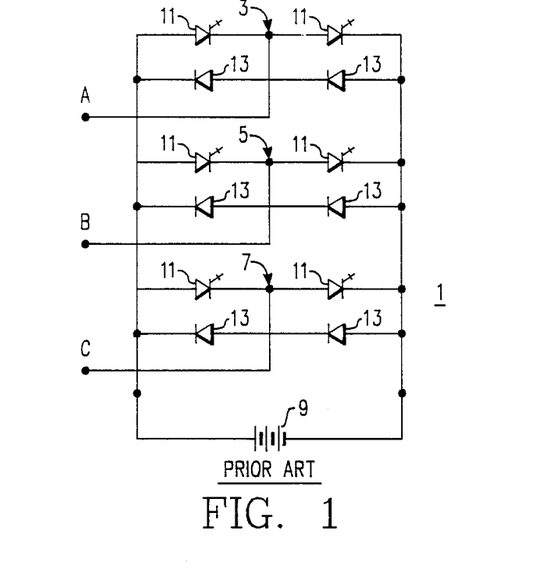
FIG. 1 is a schematic circuit diagram of the well known prior/art six-pulse bridge inverter circuit.

The basic building block of the quasi-harmonic neutralized static power inverter of the invention is the threephase harmonic neutralized six-pulse bridge inverter circuit 1 shown in FIG. 1. This bridge inverter circuit 1 consists of three inverter poles 3, 5, and 7 connected across a dc voltage source 9. Each pole has two switching devices 11 connected in series across the dc source 9 with the junction between the two switching devices 11 being the output terminals A, B, and C. The switches 11 are preferably gate turnoff thyristors (GTOs). Other switching devices such as power MOSFETS, power transistors and in some modes of operation, thyristors can be used. Thyristors can only be used where commutation is natural such as in an ac drive system for an over excited synchronous motor. Each of the switches 11 is shunted by a free wheeling diode 13 which permits reverse current to flow.

Figure 2:
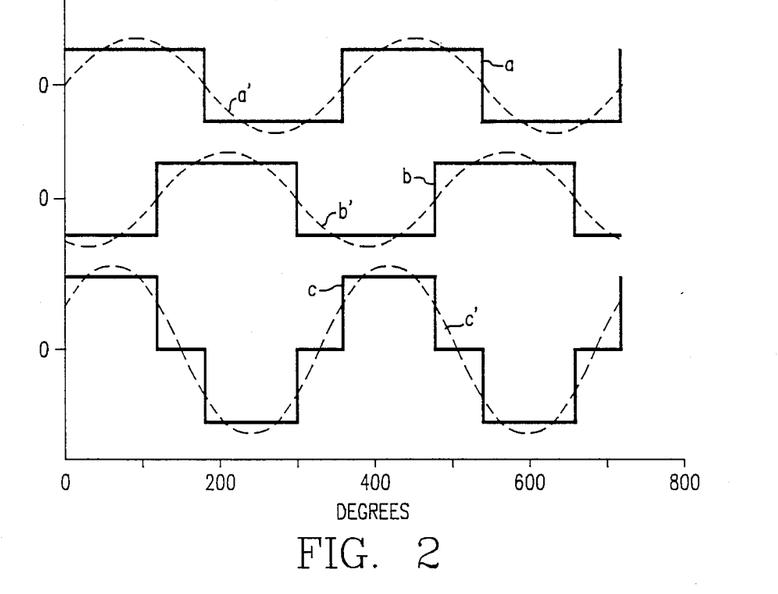
FIG. 2 is a waveform diagram illustrating waveforms generated during conventional operation of the six-pulse bridge inverter circuit of FIG. 1.

FIG. 2 illustrates some of the waveforms developed in the six-pulse bridge inverter circuit 1. Traces a and b illustrate the square wave phase A to dc midpoint and phase B to dc midpoint voltages while trace c illustrates the phase A to B voltage. Traces a', b', and c' illustrate the fundamental ac waveforms for the respective voltages. As can be seen from FIG. 2, each switch conducts for 180 degrees and the waveforms generated in the individual phases are shifted by 120 degrees with respect to one another. It can also be appreciated that a pole transition occurs every 60 degrees and hence there are six state changes in a cycle of the fundamental frequency. Thus, the output voltages produced between the three ac terminals A, B, And C of the bridge inverter circuit 1 are true six-pulse waveforms.

Figure 3:
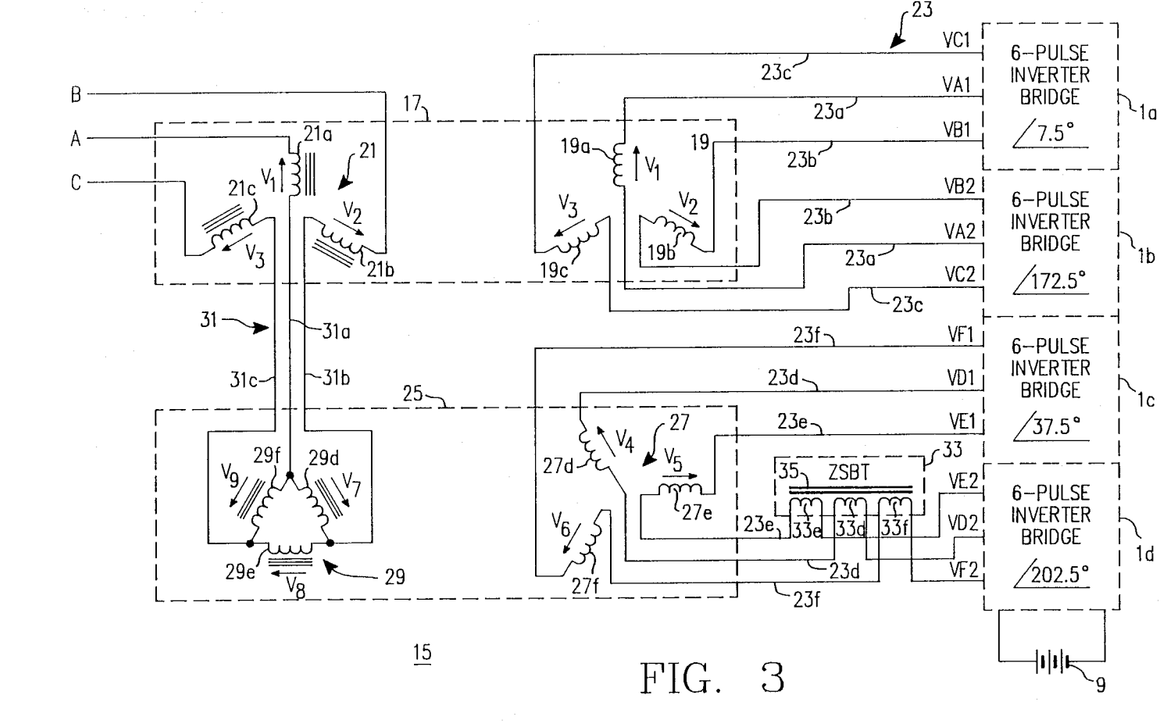
FIG. 3 is a schematic diagram of one embodiment of a 24-pulse quasi-harmonic neutralized static power inverter in accordance with the invention incorporating four six-pule bridge inverters of the type shown in FIG. 1.

FIG. 3 illustrates a 24-pulse quasi-harmonic neutralized static power inverter in accordance with the invention. This inverter 15 includes four of the six-pulse bridge inverter circuits 1a, 1b, 1c, and 1d, all powered by the dc voltage source 9. Associated with each pair of six-pulse bridge inverter circuits is a threephase transformer. The transformer 17 associated with the six-pulse bridge inverter circuits 1a and 1b has an open primary winding 19 comprising windings 19a, 19b, and 19c, and an open wye connected secondary winding 21 comprising windings 21a, 21b and 21c. Opposite ends of each the of the primary windings are connected to poles in separate ones of the six-pulse bridge inverter circuits 1a and 1b of the associated pair of bridge inverter circuits by first connecting means 23 comprising the leads 23a, 23b, and 23c.

The threephase phase shifting transformer 25 associated with the six-pulse bridge inverter circuits 1c and 1d also has open wye primary 27 with windings 27a, 27b, and 27c. Again opposite ends of each of these primary windings are connected to poles in different ones of the associated six-pulse bridge inverter circuits 1c and 1d by the leads 23d, 23e, and 23f of the first connecting means 23. The secondary winding 29 of the transformer 25 comprises delta connected windings 29d, 29e, and 29f.

The secondary winding 21 of the transformer 17 and 29 of the transformer 25 are connected by second connecting means 31 which includes the leads 31a, 31b, and 31c to produce the threephase output A, B, and C.

The first pair of six-pulse bridge inverter circuits 1a and 1b are operated at phase angles which lead the fundamental output (using A to ground as the reference) A, B, C by 7.5 and 172.5 degrees respectively. The second pair of six-pulse bridge inverter circuits 1c and 1d are operated at phase angles which lead the fundamental output by 37.5 and 202.5 degrees. The resultant fundamental voltages impressed across the primaries of the two transformers are thus displaced by 30 degrees. Since the transformer 17 has wye primary and wye secondary windings, there is no phase shift between the voltages on the primary and the secondary. However, the wye primary and delta secondary windings on the transformer 25 produce a 30 degree phase shift in the voltages generated in the secondary with respect to the primary. Hence, the resultant fundamental voltages generated on the secondaries of the transformers 17 and 25 are in phase and add directly to produce a twenty-four pulse output waveform.

The delta secondary 29 of the transformer 25 in inverter 15 provides a short circuit for zero sequence voltages which are generated in the voltages at the outputs of the six-pulse bridge inverter circuits 1c and 1d. In accordance with the invention, a zero sequence blocking transformer 33 is provided to support the component of zero sequence voltage generated in each phase and thereby limit or block the flow of zero sequence current. In the embodiment of the invention shown in FIG. 3, the zero sequence blocking transformer comprises three identical zero sequence blocking windings 33d, 33e, and 33f which are each connected in series with a separate one of the primary endings 27d, 27e, and 27f respectively of the transformer 25. Preferably, all of zero sequence blocking windings are wound on a common core 35.

Figure 4:
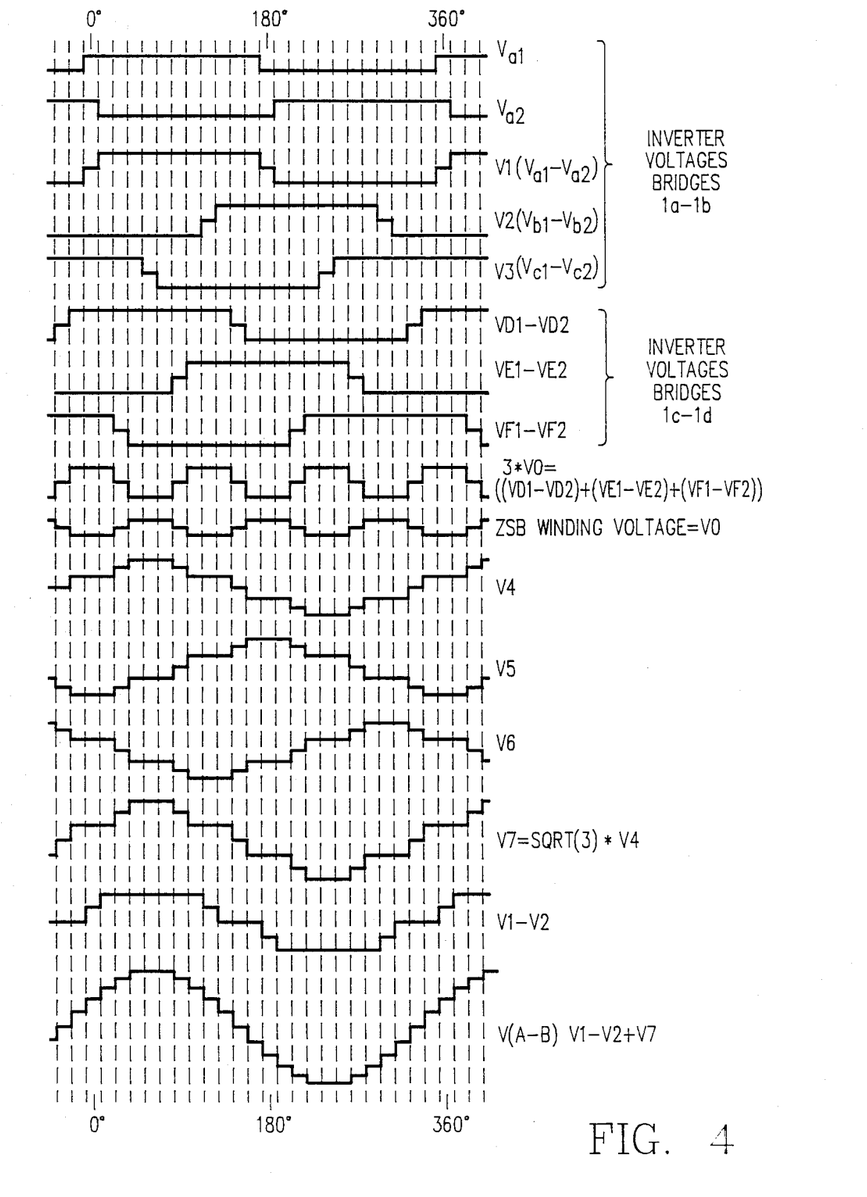
FIG. 4 is a waveform diagram illustrating waveforms generated during generation of the inverter of FIG. 3.

FIG. 4 illustrates exemplary waveforms generated in the inverter of FIG. 3. The voltage Va1 generated by bridge 1a which leads the phase A to neutral output fundamental voltage by 7.5 degrees and the voltage Va2 generated by the bridge 1b which leads the fundamental by 172.5 degrees combine to produce the voltage V1 which appears across the primary winding 19a of the transformer 17. The voltages V2 and V3 are impressed across the primary windings 19b and 19c respectively by the other poles of the inverter bridge circuits 1a and 1b. Similar threephase voltages advanced by 30 degrees are generated across the primary windings 27d, 27e and 27f in series with the zero sequence windings 33d, 33e, and 33f by the six-pulse bridge inverter circuits 1c and 1d. It will be noticed that these quasi-square wave voltages impressed across the primaries of the transformers 17 and 25 have 15 degree notches produced by the 15 degree shift between the voltages applied to opposite ends of each primary winding by the associated pair of six-pulse inverter bridge circuits. These 15 degree notches combined with the 30 degree phase shift between the two quasi-square wave voltages impressed on the primaries of the transformers 17 and 25 are what allow the inverter 15 to generate a 24-pulse output waveform with one-half the number of phase shifting transformers.

Because the transformer 17 has wye/wye windings the voltages V1, V2 and V3 across the secondary windings 21 of the transformer 17 are not phase shifted and appear as shown in FIG. 3.

The sum of the three quasi-square wave voltages V1, V2, V3 generated across the respective terminals of inverter bridges 1c and 1d (3VO) s illustrated in FIG. 4. This is the total zero sequence voltage which would be coupled to the delta secondary loop if the zero sequence blocking transformer 33 were not provided. Since the delta secondary winding would provide a short circuit for this voltage, this configuration of the inverter 15 would not be operable without the zero sequence blocking transformer 33. Each of the coils of the zero sequence blocking transformer 33 supports a voltage ZSB which is equal to the zero sequence voltage V0 for the associated phase. This zero sequence voltage exactly opposes the zero sequence component of each phase voltage generated by the inverter pairs connected to each of the primary windings. Thus, the resultant voltage V4 which appears across the primary winding 27d is equal to VD1 minus VD2 minus the zero sequence voltage V0. Similarly, the zero sequence voltages for the other phases of the transformer 25 subtract from the voltages generated by the associated pair of six-pulse bridge inverter circuits to produce the voltages V5 and V6. As is known, for a threephase wye/delta transformer having equal magnitude line to line voltages on the primary and secondary windings, the turns ratio between the primary and secondary windings is the square root of 3. In the case of transformer 25, the delta winding voltage V7 in secondary 20 winding 29d is equal to square root of 3 times the voltage V4. The line to line voltages in the delta windings of the secondary are therefore in phase with the voltages across he open wye primary. In FIG. 3, the transformer 25 is configured so that the threephase voltages at its secondary lag the primary voltages by 30 degrees. It can be seen from FIG. 4, that the fundamental component of V7 from transformer 25, is in phase with the line to line voltage V(A-B). This voltage V7 therefore sums directly with the voltage (V1-V2), from transformer 17, to produce a composite 24-pulse output V(A-B) as shown. Similar 24-pulse phase to phase voltages are generated across the other output terminals of the inverter 15.

It is not necessary that the zero sequence blocking transformer be inserted in series with the primary windings of the wye/delta phase shifting transformer 25 in the inverter 15 of FIG. 3. The modified inverter 37, shown in FIG. 5, also has a phase shifting transformer 39 with an open wye primary 41 fed by the pair of bridge inverters 1c and 1d and a delta secondary 43 with windings 43d, 43e, and 43f. In this inverter, the three zero sequence blocking windings 45d, 45e, and 45f of a zero sequence blocking transformer 45 are connected in ser es with the corresponding secondary windings 43d, 43e, and 43f respectively.

Figure 5:
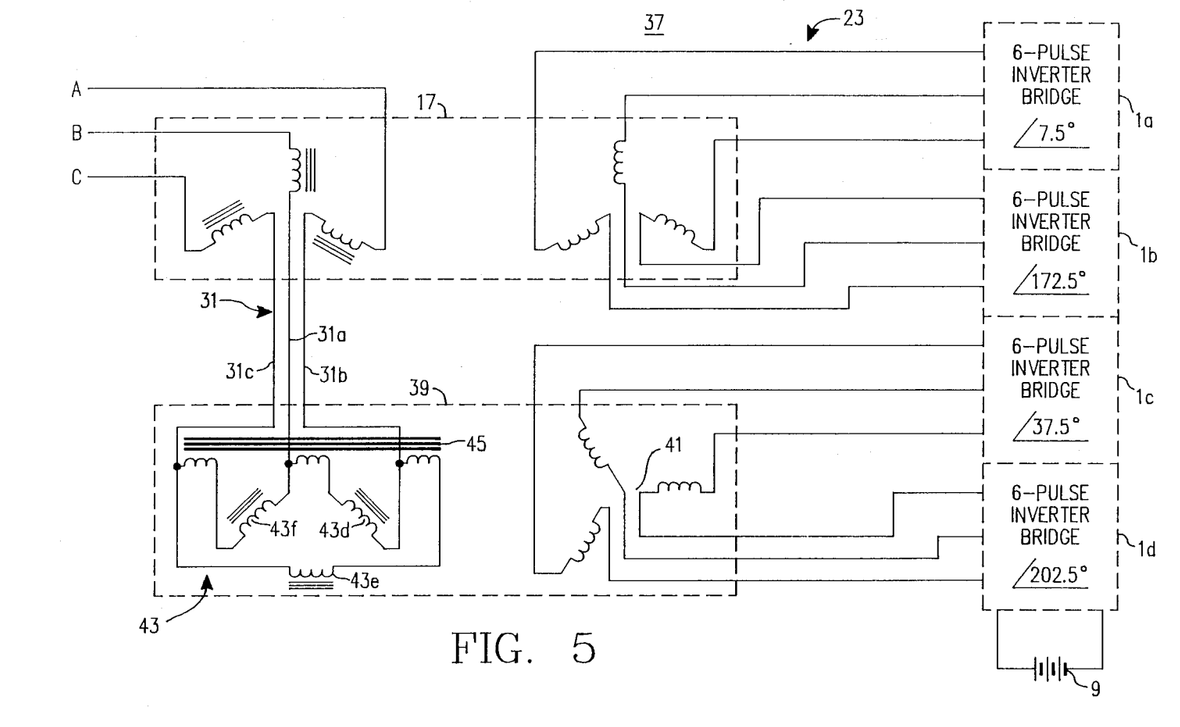
FIG. 5 is a schematic diagram of a modified form of the 24-pulse quasi-harmonic neutralized inverter of FIG. 3.
Figure 6:
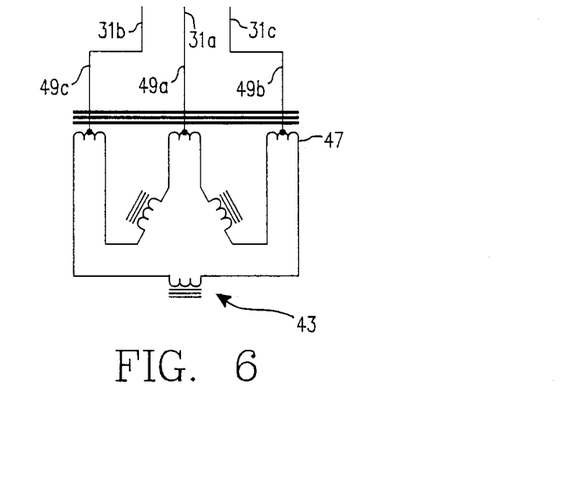
FIG. 6 is a schematic diagram of an alternate form of a portion of the inverter of FIG. 5.

FIG. 6 shows a modification to the inverter shown in FIG. 5. In this inverter, the identical zero sequence blocking windings of a zero sequence blocking transformer 47 have center taps 49a, 49b, and 49c. The windings of the zero sequence blocking transformer 47 are connected in series with the windings of the secondary 43 and the leads 31a, 31b and 31c connecting the secondary 43 to the secondary of the transformer 17 are connected to the center taps of the zero sequence windings.

Figure 7:
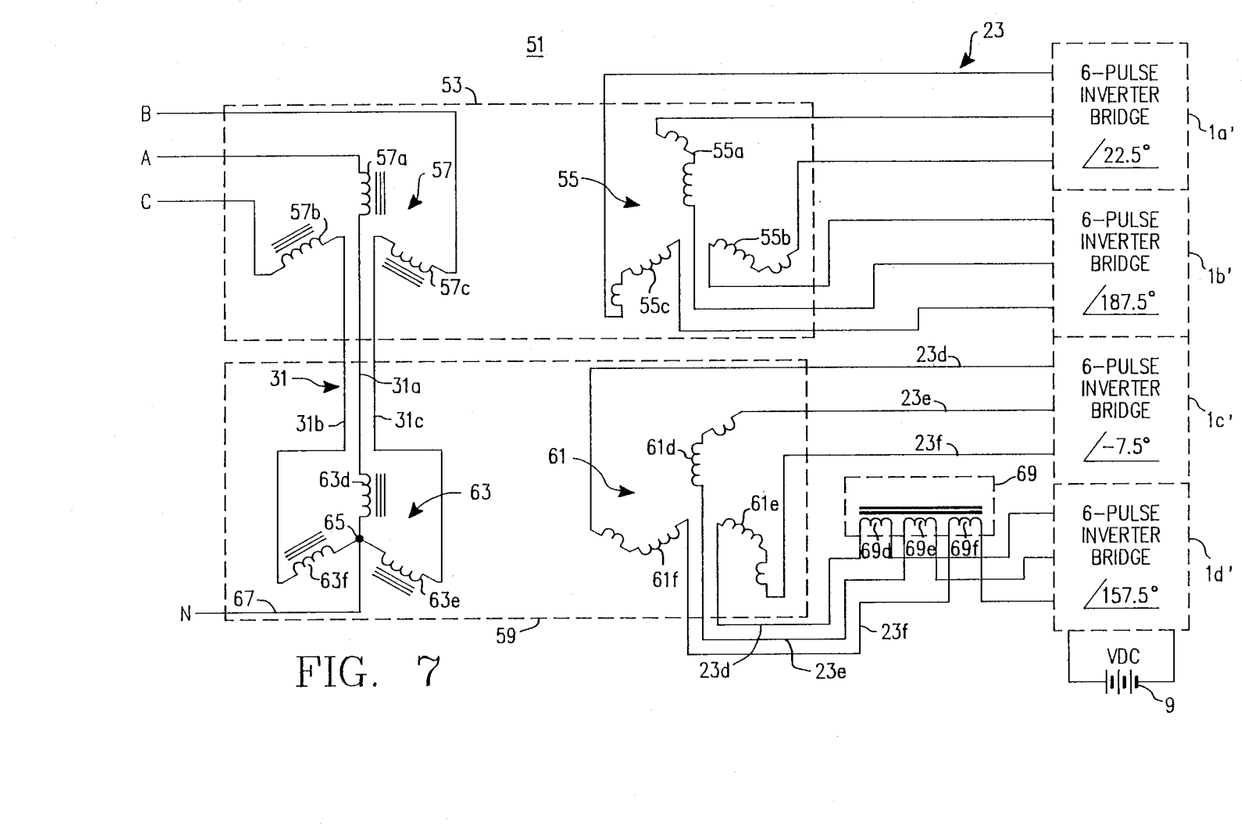
FIG. 7 is a schematic diagram of another embodiment of a 24-pulse quasi-harmonic neutralized inverter in accordance with the invention.

Another embodiment of the invention is illustrated in FIG. 7. This inverter 51 includes two phase shifting transformers 53 and 59 each with complimentary 15 degree shift zig-zag/wye windings fed by a pair of six-pulse inverter bridge circuits la and lb in the case of transformer 55 and 1c and 1d in the case of transformer 59. The primary 55 of the transformer 53 comprises three open zig-zag windings 55a, 55b and 55c. Similarly, the primary 61 of the transformer 59 is composed of three open zig-zag windings 61d, 61e and 61f. The zig-zag windings of the primary 55 produce 15 degrees lag in the voltages induced in the secondary 57 of the transformer 53 while the zig-zag windings of the primary 61 of the transformer 59 provide 15 degrees lead in the voltages induced in the secondary windings 63d, 63e, and 63f. Since the quasi-square wave voltage generated by the six-pulse inverter bridge 1a' leads the fundamental by 22-½ degrees and that generated by the six-pulse inverter bridge 1c' lags the fundamental by 7-½ degrees, the 15 degree lag and lead produced by the transformers 53 and 59 respectively bring the voltages induced in the secondaries 57 and 63 respectively, into phase. The secondary windings 57a, 57b, and 57c of the transformer 53 are connected in an open wye configuration. The secondary windings 63d, 63e, and 63f of the transformer 59 are connected in a closed wye configuration at midpoint 65. The secondary windings 63d, 63e, and 63i f of transformer 59 are connected in series with the secondary windings 57a, 57b and 57c of the transformer 53 by second connecting means 31 which comprises the leads 31a, 31b, and 31c. The midpoint 65 of the secondary 63 on transformer 59 is connected to a neutral line 67. This neutral line 67 provides a short circuit for zero sequence voltages induced in the secondary winding 63. Thus, in accordance with the invention, a zero sequence blocking transformer 69 is connected by the connecting leads 23d, 23e, and 23f with each one of its identical zero sequence blocking windings 69d, 69e, and 69f in series with one of the primary windings in the transformer 59.

Figure 8:
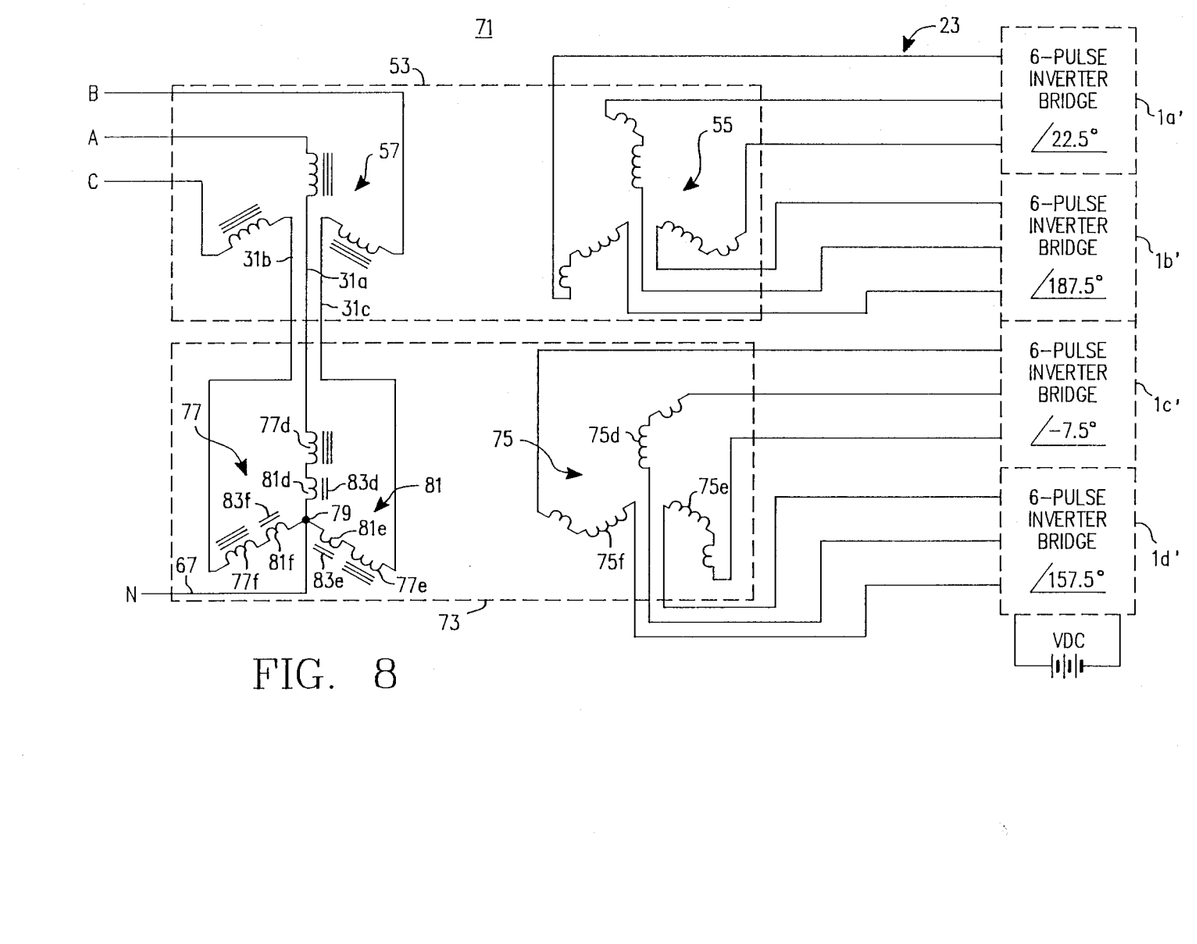
FIG. 8 is a schematic diagram of a modified form of the 24-pule quasi-harmonic neutralized inverter of FIG. 7.

FIG. 8 illustrates a modified form of the inverter 51 illustrated in FIG. 7. The difference in the inverter 71 of FIG. 8 from the inverter 51 in FIG. 7 is that the zero sequence blocking transformer 81 is connected in series with the secondary windings of phase shifting transformer 73 rather than in series with the primary windings. Thus, the transformer 73 has open wye zig-zag windings 75d, 75e, and 75f fed at opposite ends by the six-pulse inverter bridge circuits 1c' and 1d' which phase shift the waveforms generated by this pair of inverters by 15 degrees. The secondary 77 of the transformer 73 includes closed wye windings 75d, 75e, and 75f connected the grounding line 67 at midpoint 79. The zero sequence blocking transformer has one of its identical zero sequence blocking windings 81d, 81e and 81f in series with one of the winding of the secondary 77. While separate cores 83d, 83e, and 83f for the windings of the zero sequence blocking transformer are shown in FIG. 8, it is preferred that all three windings be wound on a common core.

Figure 9:
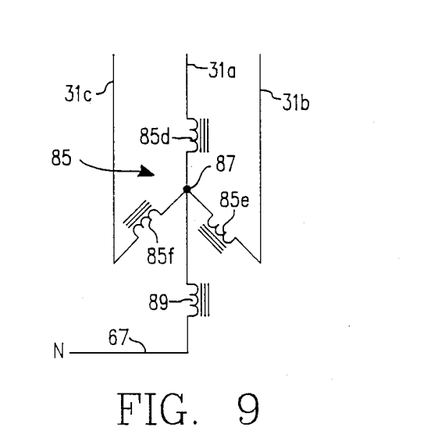
FIG. 9 is a schematic diagram of a portion of the inverter of FIG. 8.

A modified arrangement for the secondary windings of the transformer 73 in the inverter 71 of FIG. 8 is shown in FIG. 9. This secondary 85 also has closed wye windings 85d, 85e, and 85f connected a midpoint 87. In this configuration, a blocking transformer 89 having a single zero sequence blocking winding is connected in series with the neutral line 67. This blocking transformer 89 blocks zero sequence current in all three phases of the inverter 71.

While the zero sequence blocking transformer has been shown inserted in series where these are the primary or secondary winding of the phase shifting transformer with the closed wye secondary winding connected to a neutral line, it could alternatively be connected in series with either the primary or secondary windings of the other transformer. It would also be possible to provide smaller zero sequence blocking windings in series with the primaries or the secondaries of the two phase shifting transformers or even in one primary and in one secondary. However, for economic reasons, it is more practical to only provide one zero sequence blocking transformer.

Figure 10:
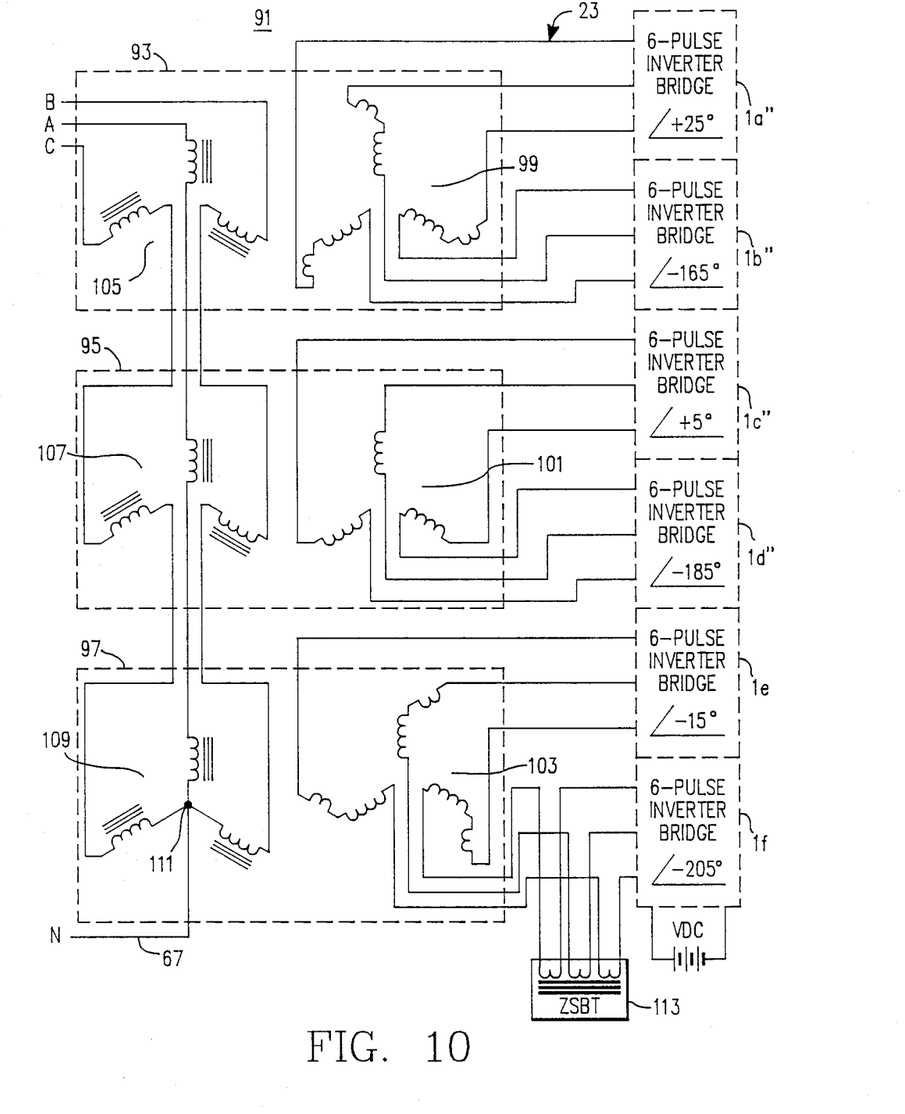
FIG. 10 a schematic diagram of a 36-pulse quasi-harmonic neutralized inverter in accordance with the inversion.

FIG. 10 illustrates a 36-pulse quasi-harmonic neutralized inverter in accordance with the invention. This inverter 91 includes three transformers 93, 95 and 97 each fed by a pair of six-pulse inverter bridge circuits 1a''- 1c'', 1d and 1e-1f, respectively. The switches in these six-pulse inverter bridge circuits are operated to generate square wave voltages which are phase shifted with respect to the inverter fundamental as follows: bridge 1a''+25 degrees, bridge 1b''- 165 degrees, bridge 1c''+5 degrees, bridge 1d- 185 degrees, bridge 1e- 15 degrees and bridge 1f- 205 degrees. The windings of the primaries of the phase shifting transformer 93, 95 and 97 are configured to generate voltages in the secondary which are all in phase with the inverter fundamental frequency. Thus the transformer 93 has a zig-zag primary winding 99 configured so that the secondary voltage lags the primary voltage by 20 degrees. The transformer 95 has straight open wye windings which effect no phase shift in the induced voltage, and transformer 97 has zig-zag primary 103 which produces a 20 degree leading phase shift in the voltage produced in the secondary. The result is the voltages induced in the secondaries 105, 107 and 109 of the transformers 93, 95 and 97 respectively are all in phase with the fundamental inverter output voltage. Since the secondary 109 of transformer 97 is a closed wye with the neutral line 67 connected to the midpoint 111, it is necessary to provide a zero sequence blocking transformer. In the configuration of the inverter 91 shown, the zero sequence blocking transformer 113 is inserted with each of its identical zero sequence blocking windings in series with one of the windings of the primary 103 in a transformer 97.

As in the case of the twenty-four pulse quasi-harmonic neutralized inverters illustrated in FIGS. 3 and 5 through 9, the zero sequence blocking transformer could alternatively be connected in series with the secondary windings of the secondary 109 of transformer 97 or in series with either the primary or secondary windings of the transformers 93 or 95. Also, as an alternative, a single zero sequence blocking transformer could be connected in the neutral line 67.

It will be clear to those skilled in the art that the invention can be applied to other quasi-harmonic neutralized inverters having other numbers of phase shifting transformers with open primaries fed by pairs of six-pulse inverter bridge circuits. It will be further appreciated by those skilled in the art that the various phase shifting transformers used in the invention can be implemented with suitable connection of single phase transformers with appropriate turns ratio. The invention could also be applied to a 12-pulse inverter comprising a single transformer fed by a single pair of six-pulse inverter bridge circuits and having either a delta secondary or a closed wye secondary with a neutral line. While this reduces the number of transformers required, the harmonic content of the output is not very much improved over a conventional 12-pulse inverter.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A threephase quasi-harmonic neutralized static power inverter comprising:
   at least one pair of three phase six-pulse bridge inverter circuits;
   a three phase shifting transformer associated with each pair of six-pulse bridge inverter circuits and having threephase open wye primary windings and threephase secondary windings;
   first threephase connecting means connecting one end of each open primary winding in each threephase phase shifting transformer to a pole in one of said six-pulse bridge inverter circuits of the associated pair and connecting the other end to a pole in the other six-pulse bridge inverter circuit of the associated pair;
   second threephase connecting means connecting the secondary windings of said threephase phase shifting transformers to add waveforms generated in each of the secondary windings and produce a composite waveform having a pulse count equal to the sum of pulses generated by all of the six-pulse bridge inverter circuits, said first and second connecting means establishing a low impedance path for zero sequence currents; and a zero sequence blocking transformer inserted in said second connecting means of at least one threephase phase shifting transformer to support zero sequence voltages and thereby limit the zero sequence currents without blocking flow of positive and negative sequence currents, said zero sequence blocking transformer comprising three identical zero sequence blocking windings wound on a common core with a separate one of said zero sequence blocking windings connected in series with a separate one of said secondary windings of said at least one threephase phase shifting transformer.

2. The inverter of claim 1 wherein the secondary windings of one of said threephase phase shifting transformers are connected in a closed wye configuration to a midpoint, wherein said second connecting means includes a neutral line connected to said midpoint, and wherein each one of the three identical zero sequence blocking windings of the zero sequence blocking transformer is connected in series with a separate one of the secondary windings of said one threephase phase shifting transformer.

3. A threephase quasi-harmonic neutralized static power inverter comprising:
two pair of three phase six-pulse bridge inverter circuits;
a threephase phase shifting transformer associated with each pair of six-pulse bridge inverter circuits and having threephase open wye primary windings and threephase secondary windings;
first threephase connecting means connecting one end of each open primary winding in each threephase phase shifting transformer to a pole in one of said six-pulse bridge inverter circuits of the associated pair and connecting the other end to a pole in the other six-pulse bridge inverter circuit of the associated pair;
second threephase connecting means connecting the secondary windings of said threephase shifting transformers to add waveforms generated in each of the secondary windings and produce a twenty-four pulse composite waveform, said first and second connecting means establishing a low impedance path for zero sequence currents; and
a zero sequence blocking transformer inserted in at least one of said first and second connecting means to support zero voltages and thereby limit the zero sequence currents without blocking flow of positive and negative sequence currents, said zero sequence blocking transformer comprising three identical zero sequence blocking windings wound on a common core, a separate one of said zero sequence blocking windings being connected in each of the threephases by said at least one of said first and second connecting means.

4. The inverter of claim 3 wherein said zero sequence blocking transformer is inserted in said first connecting means of one of said threephase phase shifting transformers with each one of said identical windings on the zero sequence blocking transformer connected in series with a separate one of said primary windings.

5. The inverter of claim 3 wherein one threephase phase shifting transformer has open wye secondary windings and the other threephase phase shifting transformer has delta connected secondary windings and wherein said zero sequence blocking transformer is connected with a separate one of its identical zero sequence blocking windings connected in series with a separate one of the secondary windings of said other transformer with delta connected secondary windings.

6. The inverter of claim 5 having center taps on each of the identical zero sequence blocking windings of the zero sequence blocking transformer and wherein said second connecting means connects the secondary of said one transformer with the open wye connected secondarywindings to said tap points.

7. The inverter of claim 3 wherein one of said threephase phase shifting transformers has open wye connected secondary windings, wherein the other threephase phase shifting transformer has closed wye connected secondary windings connected to a midpoint, wherein said second connecting means includes means connecting corresponding ones of the secondary windings in said threephase phase shifting transformers in series, wherein said second connecting means includes a neutral line connected to said midpoint and wherein each of said identical zero sequence blocking windings of the zero sequence blocking transformer is connected in series with separate of said corresponding ones of the secondary windings of said threephase phase shifting transformers.

8. The inverter of claim 7 wherein at least one of said primary and secondary windings of said threephase phase shifting transformers comprise zig-zag windings which shift waveforms generated on the primary windings into waveforms in the secondary windings of the threephase phase shifting transformers having fundamental frequencies which are in phase.

9. The inverter of claim 3 wherein said threephase phase shifting transformers each comprise three single phase transformers having primary windings connected by the first connecting means and secondary windings connected by the second connecting means to generate said composite wave form having a pulse count equal to the sum of pulses generated by all of the six-pulse bridge inverter.

10. A threephase quasi-harmonic neutralized static power inverter comprising:
at least three pair of threephase six-pulse bridge inverter circuits;
a threephase phase shifting transformer associated with each pair of six-pulse bridge inverter circuits and having threephase open wye primary windings and threephase secondary windings;
first threephase connecting means connecting one end of each open primary winding in each threephase phase shifting transformer to a pole in one of said six-pulse bridge inverter circuits of the associated pair and connecting the other end to a pole in the other six-pulse bridge inverter circuit of the associated pair;
second threephase connecting means connecting the secondary windings of said threephase phase shifting transformers to add waveforms generated in each of the secondary windings and produce a composite waveform having a pulse count equal to the sum of pulses generated by all of the six-pulse bridge inverter circuits, said first and second connecting means establishing a low impedance path for zero sequence currents; and
a zero sequence blocking transformer inserted in at least one of said first and second connecting means to support zero sequence voltages and thereby limit the zero sequence currents without blocking flow of positive and negative sequence currents, said zero sequence blocking transformer comprising three identical zero sequence blocking windings wound on a common core, a separate one of said zero sequence blocking windings being connected in each of the threephases by said at least one of said first and second connecting means.

11. A threephase quasi-harmonic neutralized static power inverter comprising:

at least one pair of threephase six-phase bridge inverter circuits;

a threephase phase shifting transformer associated with each pair of six-pulse bridge inverter circuits and having threephase open wye primary windings and threephase secondary windings;

first threephase connecting means connecting one end of each open primary winding in each threephase phase shifting transformer to a pole in one of said six-pulse bridge inverter circuits of the associated pair and connecting the other end to a pole in the other six-pulse bridge inverter circuit of the associated pair;

second threephase connecting means connecting the secondary windings of said threephase phase shifting transformer to add waveforms generated in each of the secondary windings and produce a composite waveform having a pulse count equal to the sum of pulses generated by all of the six-pulse bridge inverter circuits, with the secondary windings of one of said threephase phase shifting transformer connected in a closed wye configuration to a midpoint, and with a neutral line connected to said midpoint, said first and second connecting means establishing a low impedance path for zero sequence currents; and a zero sequence blocking transformer comprising a single zero sequence blocking winding inserted in said neutral line to block zero sequence current in all three phases.

* * * * *